United States Patent
Liu et al.

(10) Patent No.: US 8,900,029 B2
(45) Date of Patent: Dec. 2, 2014

(54) METHOD FOR MAKING CARBON NANOTUBE FIELD EMITTER

(71) Applicants: Peng Liu, Beijing (CN); Shou-Shan Fan, Beijing (CN)

(72) Inventors: Peng Liu, Beijing (CN); Shou-Shan Fan, Beijing (CN)

(73) Assignees: Tsinghua University, Beijing (CN); Hon Hai Precision Industry Co., Ltd., New Taipei (TW)

(*) Notice: Subject to any disclaimer, the term of this patent is extended or adjusted under 35 U.S.C. 154(b) by 268 days.

(21) Appl. No.: 13/657,658

(22) Filed: Oct. 22, 2012

(65) Prior Publication Data
US 2013/0260634 A1    Oct. 3, 2013

(30) Foreign Application Priority Data
Mar. 29, 2012    (CN) .......................... 2012 1 0087168

(51) Int. Cl.
| | |
|---|---|
| H01J 9/12 | (2006.01) |
| H01J 9/04 | (2006.01) |
| H01J 9/02 | (2006.01) |
| H01J 1/304 | (2006.01) |
| B82Y 99/00 | (2011.01) |
| B82Y 10/00 | (2011.01) |

(52) U.S. Cl.
CPC ................. *H01J 9/025* (2013.01); *B82Y 99/00* (2013.01); *H01J 1/304* (2013.01); *H01J 2201/30469* (2013.01); *Y10S 977/939* (2013.01); *B82Y 10/00* (2013.01); *Y10S 977/842* (2013.01); *Y10S 977/742* (2013.01); *Y10S 977/762* (2013.01)

USPC ................... 445/51; 445/35; 445/46; 445/50; 313/309; 313/310; 313/311; 313/351; 313/346 R; 977/842; 977/742; 977/939; 977/762

(58) Field of Classification Search
CPC ....... H01J 1/3046; H01J 1/304; H01J 1/3044; H01J 9/025; H01J 9/027; H01J 2201/30435; H01J 2201/30469; H01J 2329/0431; H01J 2329/0455; C01B 31/02; C01B 31/022; C01B 31/0226; C01B 31/0253; C01B 31/028; B82Y 30/00; B82Y 40/00; B82B 1/002
USPC .............. 313/351, 346 R, 309–311; 977/842, 977/742, 939, 762; 445/35, 46, 50, 51
See application file for complete search history.

(56) References Cited

U.S. PATENT DOCUMENTS

| | | | |
|---|---|---|---|
| 2010/0301518 A1* | 12/2010 | Feng et al. ..................... | 264/238 |
| 2012/0070625 A1* | 3/2012 | Liu et al. ........................ | 428/174 |
| 2013/0115439 A1* | 5/2013 | Wang et al. ................ | 428/292.1 |
| 2013/0160933 A1* | 6/2013 | Zhang et al. .................. | 156/172 |

* cited by examiner

*Primary Examiner* — Andrew Coughlin
*Assistant Examiner* — Kevin Quarterman
(74) *Attorney, Agent, or Firm* — Novak Druce Connolly Bove + Quigg LLP

(57) ABSTRACT

The present application relates to a method for making a carbon nanotube field emitter. A carbon nanotube film is drawn from the carbon nanotube array by a drawing tool. The carbon nanotube film includes a triangle region. A portion of the carbon nanotube film closed to the drawing tool is treated into a carbon nanotube wire including a vertex of the triangle region. The triangle region is cut from the carbon nanotube film by a laser beam along a cutting line. A distance between the vertex of the triangle region and the cutting line can be in a range from about 10 microns to about 5 millimeters.

18 Claims, 13 Drawing Sheets

US 8,900,029 B2

METHOD FOR MAKING CARBON NANOTUBE FIELD EMITTER

RELATED APPLICATIONS

This application claims all benefits accruing under 35 U.S.C. §119 from China Patent Application No. 201210087168.1, filed on Mar. 29, 2012 in the China Intellectual Property Office, the disclosure of which is incorporated herein by reference.

BACKGROUND

1. Technical Field

The present application relates to a method for making a field emitter, and particularly to a method for making a carbon nanotube based field emitter.

2. Discussion of Related Art

Many potential applications have been proposed for carbon nanotubes, including conductive and high-strength composites, energy storage and energy conversion devices, sensors, field emission displays, and nanometer-sized semiconductor devices.

As the carbon nanotubes are used in field emitters, shielding effect between two adjacent carbon nanotubes makes only a few carbon nanotubes emit electrons. Therefore, an emission current density of the field emitter is very small. Improving an emission voltage of the field emitter is often used to improve the emission current density. But improving the emission voltage will damage an emission tip of the field emitter. The damage to emission tips further damages the entire field emitter. Therefore, how to solve the shielding effect between two adjacent carbon nanotubes is a problem in application of a carbon nanotube field emitter.

Moreover, the carbon nanotube field emitter includes an end that is opposite to the emission tip. A high strength of the end is required, in order to support the carbon nanotube field emitter. But the strength of the end of the carbon nanotube field emitter is not very high, affecting stability of emitting electrons, and limiting the widespread use of the carbon nanotube field emitter.

What is needed, therefore, is to provide a method for making a carbon nanotube field emitter.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
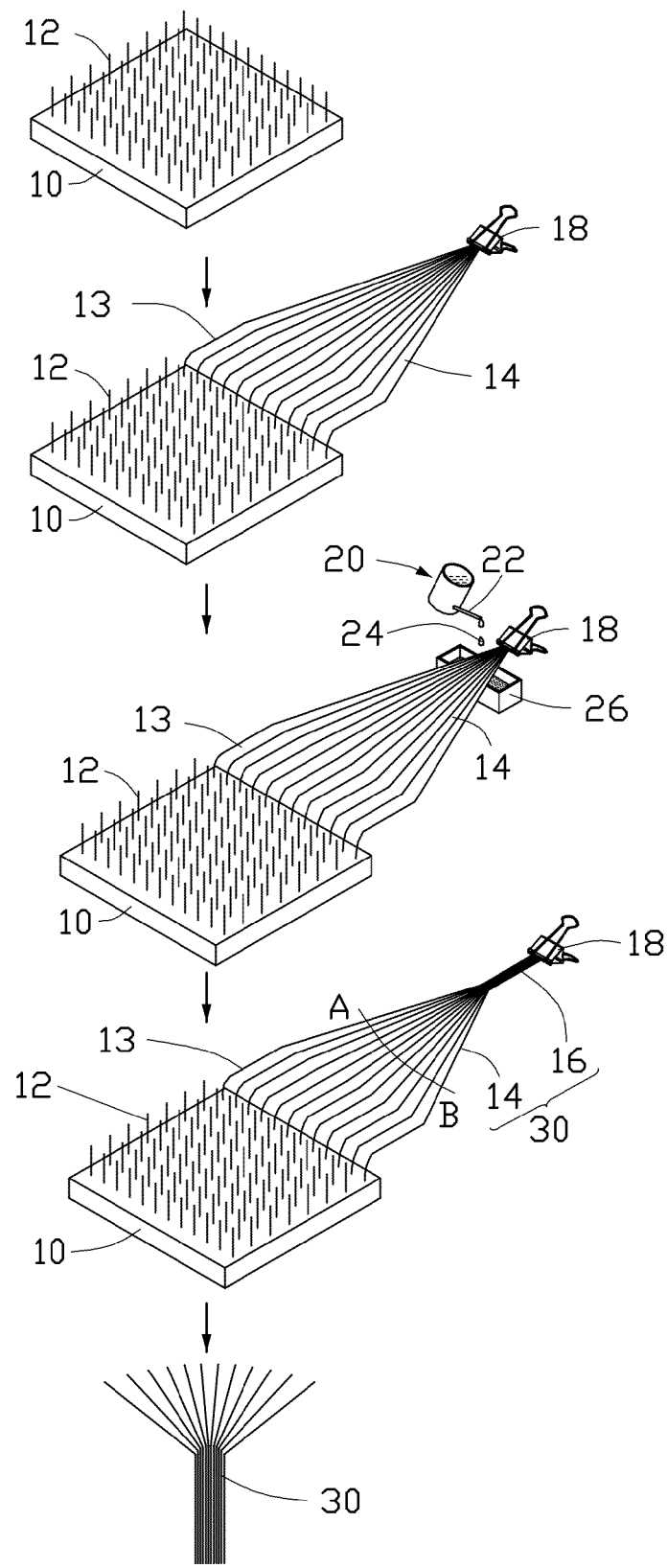
FIG. 1 is a flowchart of a first embodiment of a method for making a carbon nanotube field emitter.

Referring to FIG. 1, a method for making a carbon nanotube field emitter 30 of the first embodiment includes following steps:

S1, providing a carbon nanotube array 12 located on a surface of a substrate 10;

S2, selecting some carbon nanotube segments of the carbon nanotube array 12 and pulling out a carbon nanotube film from the carbon nanotube array 12 by a drawing tool 18, wherein the carbon nanotube film includes a triangle region 14;

S3, treating a portion of the carbon nanotube film with an organic solvent 24 to form a carbon nanotube wire 16, wherein the carbon nanotube wire 16 includes a vertex of the triangle region 14;

S4, cutting off the triangle region 14 from the carbon nanotube film by a laser beam along a cutting line AB, wherein a distance between the vertex of the triangle region 14 and the cutting line AB can be in a range from about 10 microns to about 5 millimeters, to obtain a fan-shaped or triangular carbon nanotube field emitter 30.

In step S1, the substrate 10 can be a substantially flat and smooth silicon substrate with a diameter of 4 inches, wherein the silicon substrate can be a P-type silicon wafer, an N-type silicon wafer or a silicon wafer formed with an oxidized layer thereon. In the first embodiment, a 4-inch, P-type silicon wafer is used as the substrate 10.

The carbon nanotube array can be a super-aligned array formed by a chemical vapor deposition method. The chemical vapor deposition method for making the carbon nanotube array generally includes the following steps:

S11, forming a catalyst layer on the substrate, wherein the catalyst layer is made of a material selected from the group consisting of iron (Fe), cobalt (Co), nickel (Ni), and an alloy thereof. In the first embodiment, the catalyst layer is Fe;

S12, annealing the substrate with the catalyst layer in air at a temperature in a range from 700° C. to 900° C. for about 30 minutes to about 90 minutes;

S13, providing a carbon source gas at high temperature to a furnace for about 5 minutes to about 30 minutes to grow the carbon nanotube array on the substrate, wherein the substrate has been put in the furnace which has been heated to a temperature of 400° C.-740° C. and is filled with a protective gas. The carbon source gas can be, e.g., methane, ethylene, propylene, acetylene, methanol, ethanol, or a mixture thereof. The protective gas can, preferably, be made up of at least one of nitrogen (N2), ammonia (NH3), and a noble gas in the present embodiment.

The growth rate of the carbon nanotube array 12 needs to be high, while the deposition rate of amorphous carbon needs to be low. The growth rate of carbon nanotube array 12 is proportional to a difference between the furnace temperature and the local temperature of the catalyst. Generally, the difference in the temperatures is controlled to be at least 50° C., in order to enhance the growth rate of the carbon nanotube array 12. The deposition rate of amorphous carbons is proportional to the partial pressure of carbon source gas. In practice, the local temperature of the catalyst can be controlled by adjusting the flow rate of carbon source gas, and the furnace temperature can be directly controlled. The partial pressure of carbon source gas can be controlled by adjusting the ratio of the flow rates of the carbon source gas and the protecting gas. Typically, the partial pressure of the carbon source gas is no more than 0.2, and preferably no more than 0.1.

Moreover, the carbon nanotube array 12 formed under the above conditions is essentially free of impurities such as carbonaceous or residual catalyst particles.

In step S2, the carbon nanotube film is obtained by extracting a portion of the carbon nanotube array 12 by the substeps of:

S21 selecting some carbon nanotube segments of the carbon nanotube array 12 having a determined width, and then using a drawing tool with the predetermined width to secure the end of the carbon nanotube segments of the carbon nanotube array 12;

S22 pulling the drawing tool 18 away from the carbon nanotube at an even/uniform speed to make the carbon nanotube segments of the carbon nanotube array 12 separate from the carbon nanotube array 12.

In step S22, the pulling direction can be substantially perpendicular to the growing direction of the carbon nanotube array. The drawing tool 18 can be a nipper, a clamp, an adhesive tape, and so on.

In step S22, during the extracting process, when the end of the carbon nanotube segments of the carbon nanotubes of the carbon nanotube array 12 is drawn out, other carbon nanotube segments are also drawn out in a manner that ends of a carbon nanotube is connected with ends of adjacent carbon nanotubes, by the help of the van der Waals attractive force between the ends of carbon nanotube segments. This characteristic of the carbon nanotubes ensures that a continuous carbon nanotube film can be formed.

In step S22, during the extracting process, a width of the carbon nanotube film increases gradually. In detail, the carbon nanotube segments selected by a clip as the drawing tool 18 is continuously drawn out, to obtain the carbon nanotube film. The width of the carbon nanotube film increases gradually because some carbon nanotube segments adjacent to the carbon nanotube segments are continuously drawn out due to the van der Waals attractive force. Therefore, a triangular part of the carbon nanotube film is first formed, wherein the carbon nanotube segments selected by the drawing tool 18 form a vertex of the triangular part of the carbon nanotube film. Then, a rectangular part of the carbon nanotube film is obtained, with continuous drawing. The carbon nanotube film includes the triangle region 14 and a rectangular region 13. In one embodiment, the carbon nanotube film only includes the triangle region 14.

The carbon nanotube film can comprise or consist of a plurality of carbon nanotubes. In the carbon nanotube film, the overall aligned direction of a majority of carbon nanotubes is parallel to a surface of the carbon nanotube film. A majority of the carbon nanotubes in the rectangular region 13 are substantially aligned along the same direction in the carbon nanotube film. A majority of the carbon nanotubes in the triangle region 14 are radially arranged. Along the aligned direction of the majority of carbon nanotubes, each carbon nanotube is joined to adjacent carbon nanotubes end to end by van der Waals attractive force therebetween, whereby the carbon nanotube film is capable of being free-standing structure. There may be a minority of carbon nanotubes in the carbon nanotube film that are randomly aligned. However, the number of the randomly aligned carbon nanotubes is very small and does not affect the overall oriented alignment of the majority of carbon nanotubes in the carbon nanotube film. The majority of the carbon nanotubes in the rectangular region 13, that are substantially aligned along the same direction may not be exactly straight, can be curved at a certain degree, are not exactly aligned along the overall aligned direction, and can deviate from the overall aligned direction by a certain degree. Therefore, partial contacts can exist between the juxtaposed carbon nanotubes in the majority of the carbon nanotubes aligned along the same direction in the rectangular region 13 of carbon nanotube film. The carbon nanotube film may include a plurality of successive and oriented carbon nanotube segments. The plurality of carbon nanotube segments are joined end to end by van der Waals attractive force. Each carbon nanotube segment includes a plurality of carbon nanotubes substantially parallel to each other, and the plurality of paralleled carbon nanotubes are in contact with each other and combined by van der Waals attractive force therebetween. Therefore, the carbon nanotube film includes a plurality of carbon nanotubes joined end-to-end by van der Waals attractive force. There can be clearances between adjacent and juxtaposed carbon nanotubes in the carbon nanotube film. A thickness of the carbon nanotube film at the thickest location can be in a range from about 0.5 nanometers to about 100 microns. In some embodiments, the thickness of the carbon nanotube film at the thickest location is in a range from about 0.5 nanometers to about 10 microns.

The term "free-standing" includes, but not limited to, a carbon nanotube film that does not have to be supported by a substrate. For example, a free-standing carbon nanotube film can sustain the weight of itself when it is hoisted by a portion thereof without any significant damage to its structural integrity. So, if the free-standing carbon nanotube film is placed between two separate supporters, a portion of the free-standing carbon nanotube film, not in contact with the two supporters, would be suspended between the two supporters and yet maintain film structural integrity. The free-standing carbon nanotube film is realized by the successive carbon nanotubes joined end to end by van der Waals attractive force.

Figure 2:
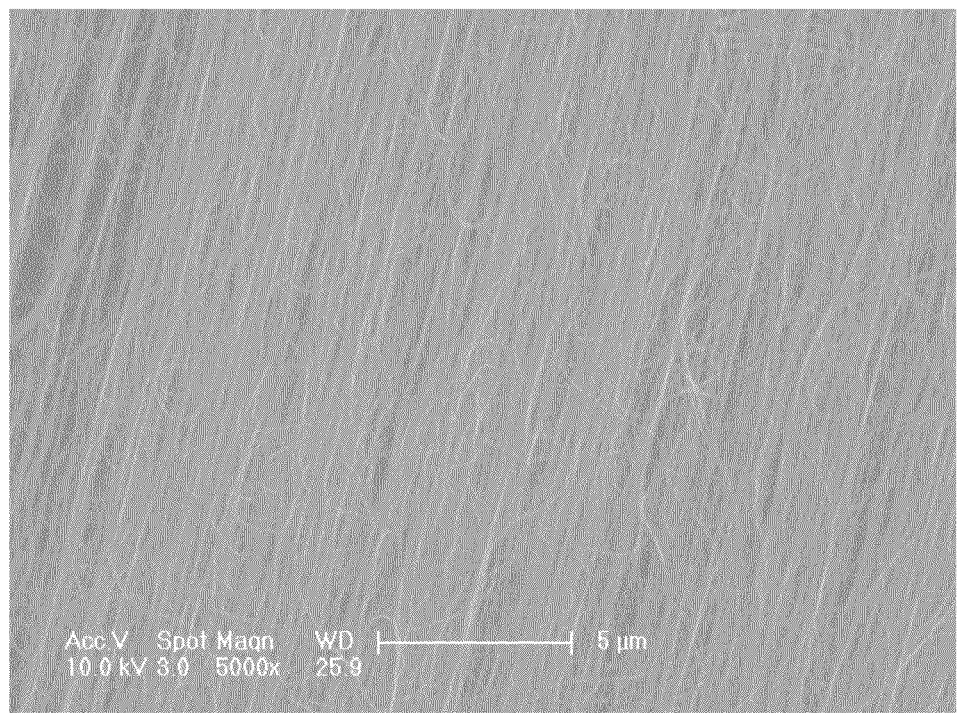
FIG. 2 shows a scanning electron microscope (SEM) image of a carbon nanotube film.

The plurality of carbon nanotubes in the triangle region 14 of the carbon nanotube film define a fan-shaped divergence along directions from a position of the drawing tool 18 to the surrounding of the drawing tool 18. The plurality of carbon nanotubes in the rectangular region 13 of the carbon nanotube film is oriented along a preferred orientation. The orientation of the plurality of carbon nanotubes in the rectangular region of the carbon nanotube film is parallel to the extracting direction as seen in FIG. 2.

In step S3, the portion of the carbon nanotube film closes to the drawing tool 18, and the portion of the carbon nanotube film includes the carbon nanotube segments selected by the drawing tool 18. A method for treating the portion of the carbon nanotube film with the organic solvent 24 can be selected according to need. In one embodiment, a first container 20 is located on upside of the carbon nanotube segments selected by the drawing tool 18. The first container 20 fills with the organic solvent 24. The organic solvent 24 can be ethanol, methanol, acetone, dichloroethane, chloroform, or the combinations thereof. In the first embodiment, the organic solvent 24 is ethanol. The first container 20 includes a tunnel 22 on its sidewall. The organic solvent 24 is dropped from the tunnel 22 to wet the vertex of the triangle region 14 of the carbon nanotube film. A second container 26 located on downside of the triangle region 14 of the carbon nanotube film is used to hold the organic solvent 24 from the tunnel 22. The entire vertex of the triangle region 14 of the carbon nanotube film is soaked by the organic solvent 24. After being soaked by the organic solvent 24, the entire vertex of the triangle region 14 of the carbon nanotube film is shrunk into a carbon nanotube wire 16, due to the action of the surface tension of the organic solvent 24. The carbon nanotube wire 16 is connected to the triangle region 14.

The triangle region 14 of the carbon nanotube film includes a plurality of carbon nanotubes joined end-to-end by van der waals attractive force. The triangle region 14 includes an aggregated portion and a dispersed portion opposite to the aggregated portion. The carbon nanotubes at the aggregated portion are aggregated together to form the carbon nanotube wire 16. The triangle region 14 of the carbon nanotube film has a fan-shaped divergence along a direction from the aggregated portion to the dispersed portion. The carbon nanotubes are radially arranged in the triangle region 14 and have a relatively larger interspace therebetween at the dispersed portion than at the aggregated portion.

The carbon nanotube wire 16 has good mechanical strength and toughness. It is to be understood, the plurality of carbon nanotubes in the carbon nanotube wire 16 can be parallel to each other. A length of the carbon nanotube wire 16 cannot be too large, the length of the carbon nanotube wire 16 can be not more than 1 centimeter.

In step S4, in the process of cutting off the triangle region 14 from the carbon nanotube film, the carbon nanotube film can still be in the drawing period and joined with the carbon nanotube array 12. In the lengthwise direction, one end of the carbon nanotube film is connected with the carbon nanotube array 12 by van der Waals attractive force, and the other end is held by the drawing tool 18. The section of the carbon nanotube film between the drawing tool 18 and the carbon nanotube array 12 is suspended.

In the process of cutting off the triangle region 14 from the carbon nanotube film, the carbon nanotube film can also separate from the carbon nanotube array 12. In the lengthwise direction, one end of the carbon nanotube film is supported by a support cylinder 15, and the other end is held by the drawing tool 18. The support cylinder 15 can be made to rotate/roll in place. The surface of the support cylinder 15 is relatively smooth but still exerts friction. A length of the support cylinder 15 is equal to or longer than the width of the carbon nanotube film. When contacting the surface of the support cylinder 15, the width of the carbon nanotube film is not changed. The carbon nanotube film can contact the surface of the support cylinder 15 when the support cylinder 15 is arranged at a higher level than the carbon nanotube array 12. The carbon nanotube film can also contact the bottom surface of the support cylinder 15 when the support cylinder 15 is at a lower level than the carbon nanotube array 12. In the first embodiment, the axis direction of the support cylinder 15 is substantially parallel to the top surface of the carbon nanotube array 12 and substantially perpendicular to the pulling direction of the carbon nanotube film.

In the process of cutting off the triangle region 14 from the carbon nanotube film, the cutting line AB in the carbon nanotube film is suspended. The distance between the cutting line AB and the vertex of the triangle region 14 can be in a range from about 10 microns to about 5 millimeters. In the first embodiment, the distance between the cutting line AB and the vertex of the triangle region 14 is in a range from about 10 microns to about 1 millimeter. In one embodiment, the distance between the cutting line AB and the vertex of the triangle region 14 is 200 microns. The cutting line AB in the carbon nanotube film can be an arc line or a straight line. In one embodiment, the cutting line AB is an arc line as shown in FIG. 1.

In step S4, a laser beam is used to irradiate the carbon nanotube film along the cutting line AB, until the triangle region 14 is cut off from the carbon nanotube film. The laser beam has a power of about 3.6 to about 12 watts and a moving speed of about 1 to about 1000 mm/s. The laser beam can be a YAG laser. The laser beam has a wavelength of 1.06 microns and a bean spot diameter of 20 microns. In one embodiment, the moving speed of the laser beam is in a range from about 10 mm/s to about 90 mm/s.

It is to be understood, step S4 can also be carried out by fixing the laser beam and moving the carbon nanotube film by a computer program.

The length of the cutting line AB can be in a range from about 1 millimeter to about 10 millimeters. In one embodiment, the length of the cutting line AB is in a range from about 1 millimeter to about 5 millimeters.

Figure 3:
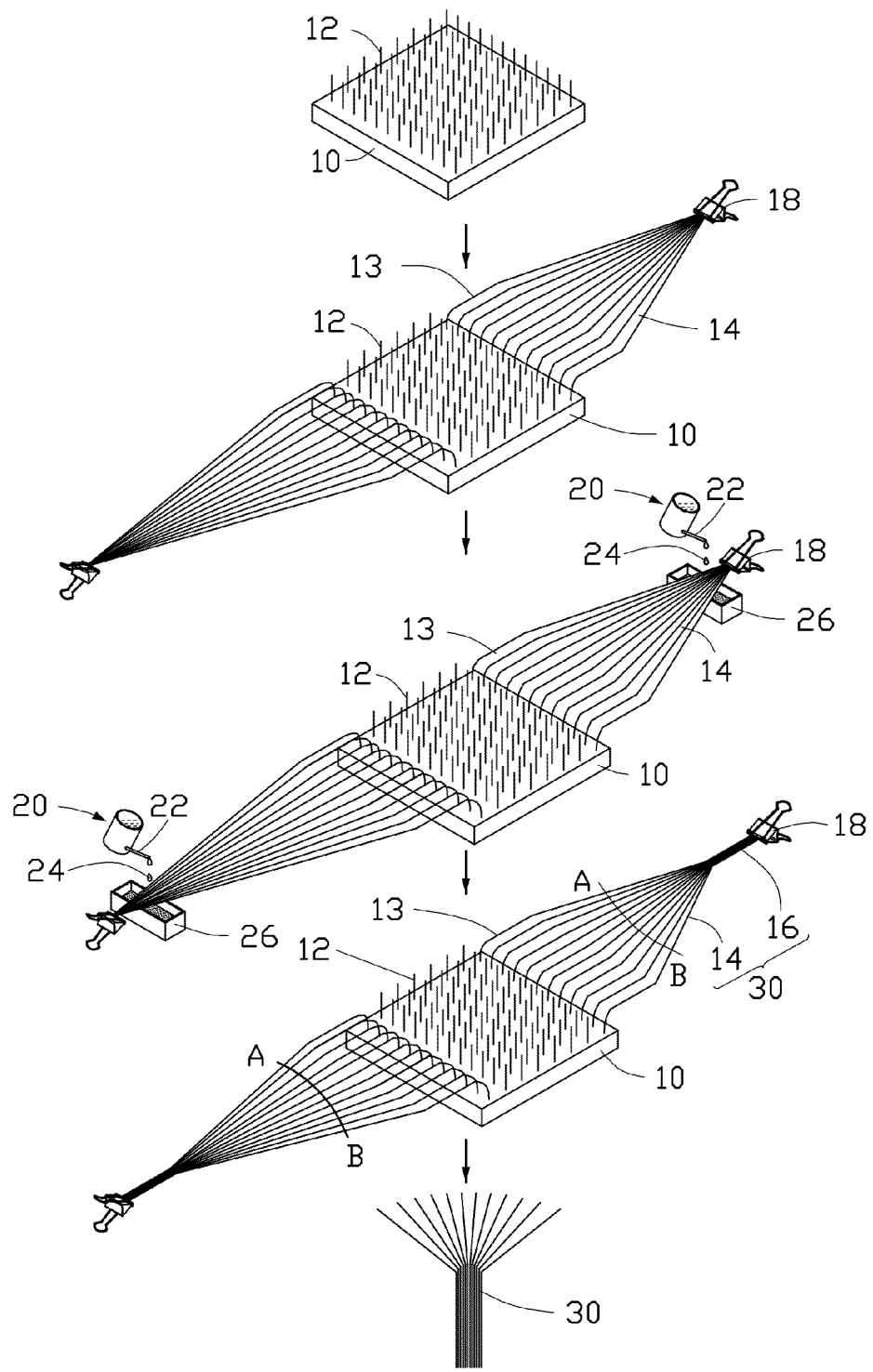
FIG. 3 is a flowchart of the first embodiment of another method for making the carbon nanotube field emitter.

It is to be understood, at least two drawing tools 18 are used to select carbon nanotube segments such that at least two carbon nanotube films can be simultaneously pull out from one carbon nanotube array 12 along different directions. Referring to FIG. 3, two drawing tools 18 are used to select carbon nanotube segments such that two carbon nanotube films are simultaneously pull out from one carbon nanotube array 12 along opposite direction.

Figure 4:
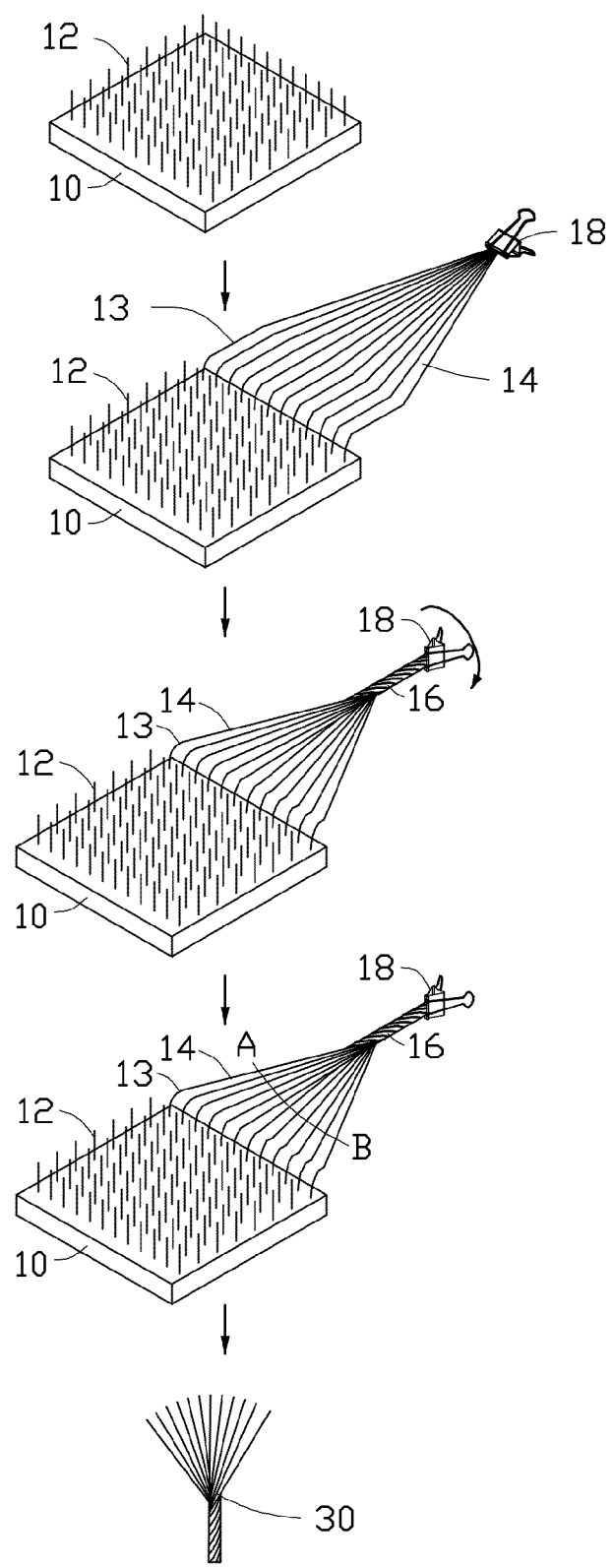
FIG. 4 is a flowchart of a second embodiment of a method for making a carbon nanotube field emitter.

Referring to FIG. 4, an embodiment of the method for making the carbon nanotube field emitter 30 is shown where the portion of the carbon nanotube film is twisted to form the carbon nanotube wire 16, wherein the carbon nanotube wire 16 includes the vertex of the triangle region 14.

In the process of twisting the portion of the carbon nanotube film to form the carbon nanotube wire 16, the carbon nanotube film is still being drawn and joined with the carbon nanotube array 12. In the length direction, one end of the carbon nanotube film is connected with the carbon nanotube array 12 by van der Waals attractive force, other end is held by the drawing tool 18. The substrate 10 can be fixed, while the drawing tool 18 is rotated, the carbon nanotube segments are twisted into the carbon nanotube wire 16. The rotation direction is substantially perpendicular to the length direction of the carbon nanotube film. The drawing tool 18 can be fixed on a rotating machine to pull and rotate simultaneously.

While rotating the drawing tool 18, a pulling force is still applied on the carbon nanotube film, and the plurality of carbon nanotube segments is twisted. Further, by pulling the drawing tool 18, more and more carbon nanotubes can be drawn from the carbon nanotube array 12 to extend the length of the carbon nanotube film. In the second embodiment, the value of twist force is in a range from about 0.00005 Newton to about 0.001 Newton.

Figure 5:
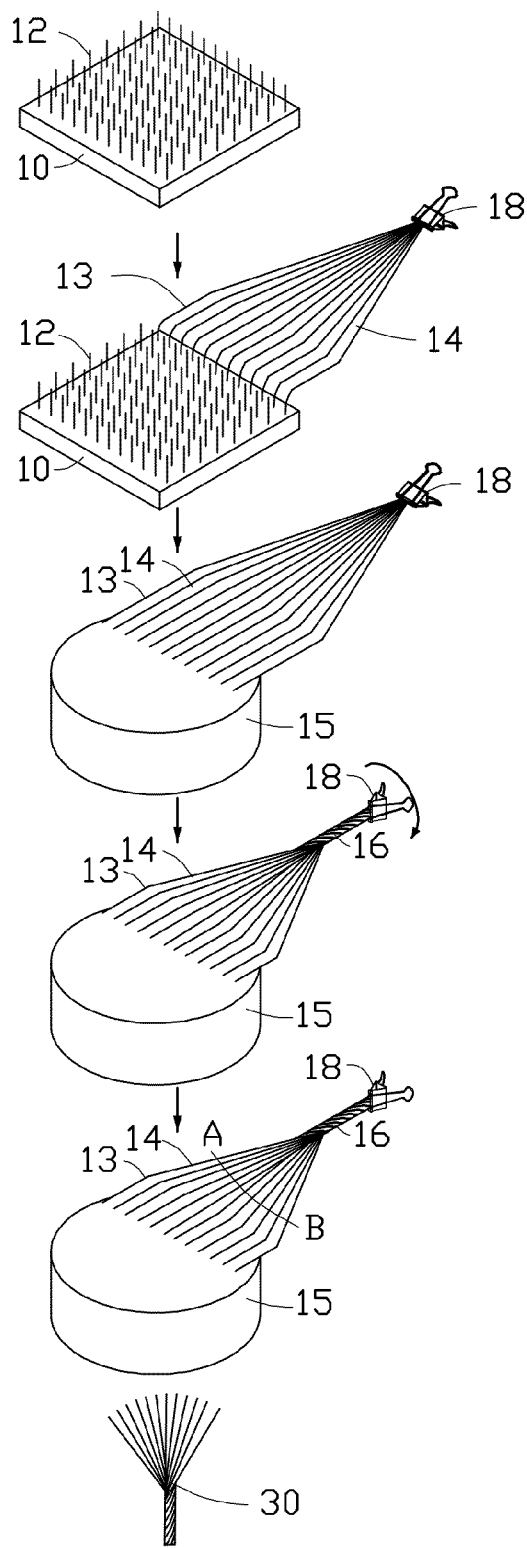
FIG. 5 is a flowchart of a second embodiment of another method for making a carbon nanotube field emitter.

Referring to FIG. 5, it is to be understood, the carbon nanotube film can be separated from the carbon nanotube array 12. In the length direction, one end of the carbon nanotube film is supported by the support cylinder 15, and the other end is held by the drawing tool 18. The support cylinder 15 and the drawing tool 18 are simultaneously twisted along two reverse directions, to twist the portion of the carbon nanotube film into the carbon nanotube wire 16.

It is to be understood, the carbon nanotube wire 16 formed by twisting the portion of the carbon nanotube film includes a plurality of carbon nanotubes helically oriented around an axial direction of the carbon nanotube wire 16. Therefore, the carbon nanotube wire 16 has a larger mechanical strength.

Figure 6:
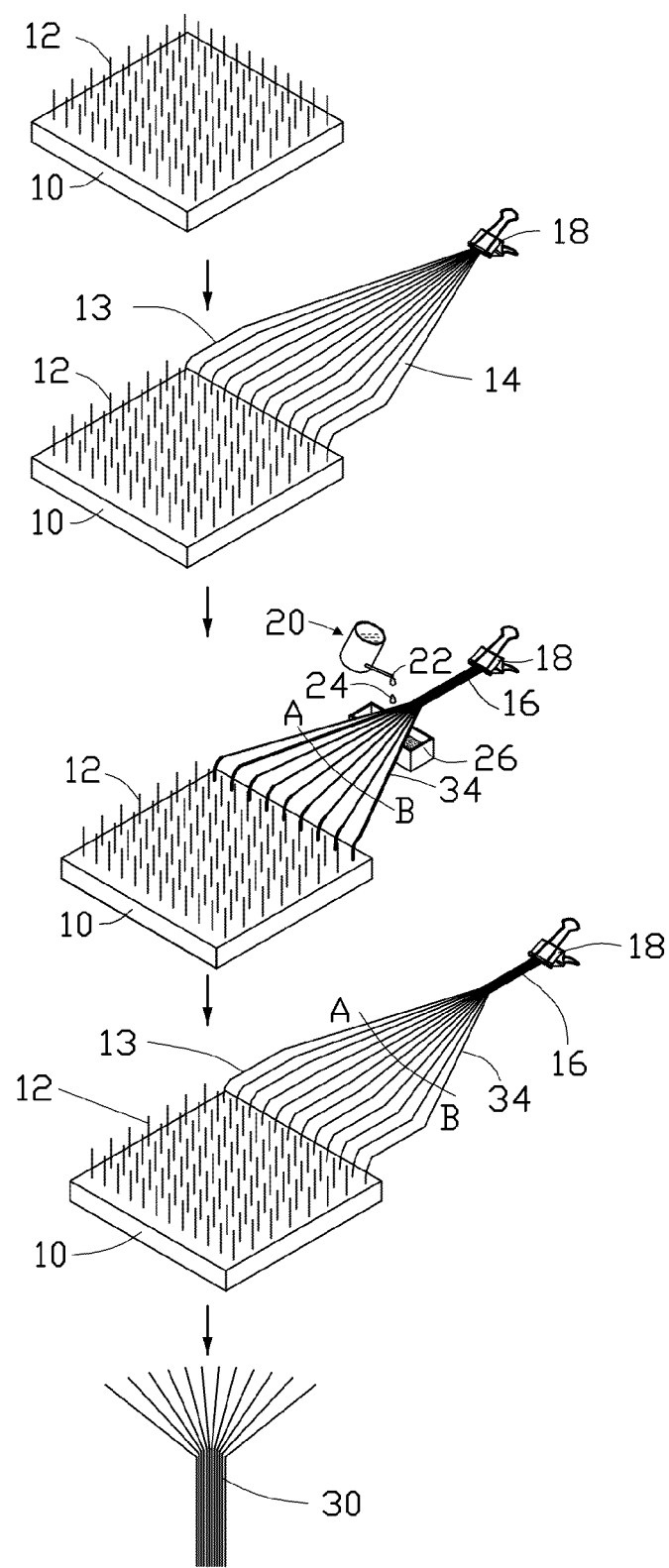
FIG. 6 is a flowchart of a third embodiment of a method for making a carbon nanotube field emitter.
Figure 7:
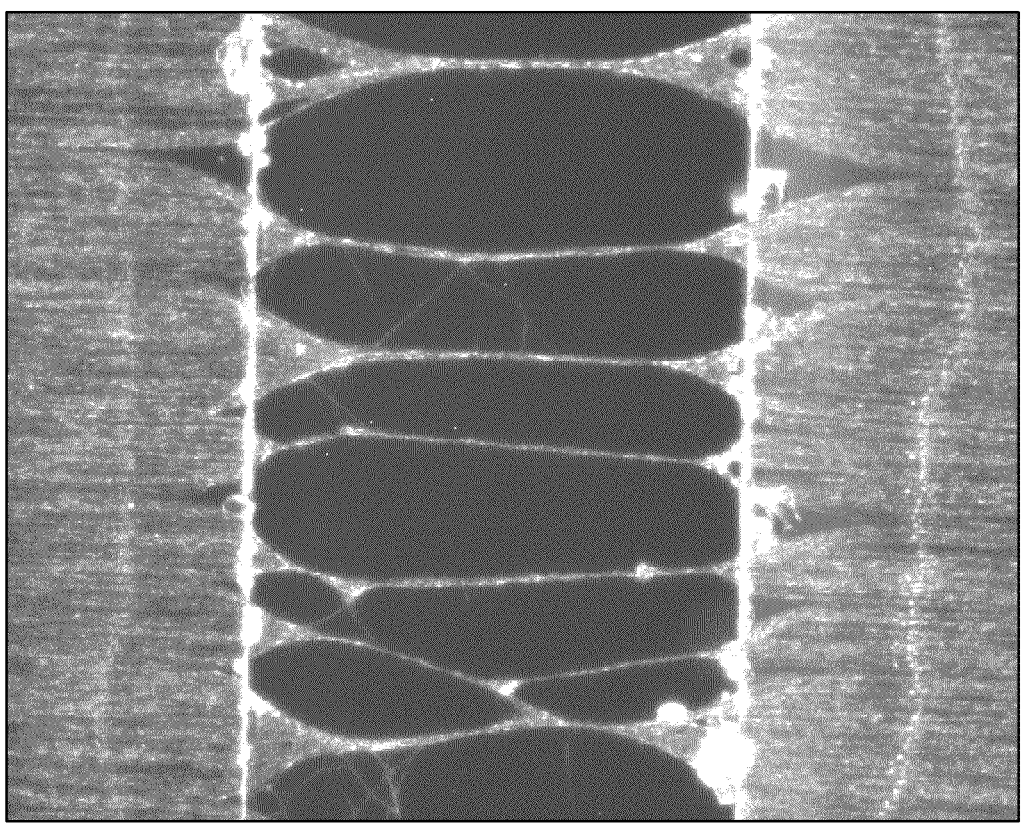
FIG. 7 shows a scanning electron microscope (SEM) image of a carbon nanotube film including some carbon nanotube strings.

Referring to FIG. 6, an embodiment of the method for making the carbon nanotube field emitter 30 is shown where before cutting off the triangle region 14 from the carbon nanotube film, the triangle region 14 is treated to a plurality of carbon nanotube strings 34 with the organic solvent 24. In this embodiment, the carbon nanotube wire 16 is formed by shrinking the portion of the carbon nanotube film with the organic solvent 24. In detail, the triangle region 14 is soaked by sprinkling the organic solvent 24, and some adjacent carbon nanotubes in the triangle region 14 would be bundled together to form a carbon nanotube string 34, due to the action of the surface tension of the organic solvent 24. FIG. 7 shows a scanning electron microscope image of a carbon nanotube film including some carbon nanotube strings. This is the result of carbon nanotube film that has been treated with the organic solvent 24 to form some carbon nanotube strings. In one aspect, due to the decrease of the specific surface area via bundling, the mechanical strength and toughness of the triangle region 14 treated with the organic solvent 24 are increased, the coefficient of friction of the triangle region 14 treated with the organic solvent 24 is reduced. In the other aspect, the sticky property of the triangle region 14 treated with the organic solvent 24 is reduced. Therefore, the triangle region 14 is treated into a plurality of carbon nanotube strings 34. One end of the plurality of carbon nanotube strings 34 is aggregated together and joined with the carbon nanotube wire 16. The other end of the plurality of carbon nanotube strings 34 has a fan-shaped divergence. The carbon nanotube strings 34 are wire-like structures within the film. Each of the plurality of carbon nanotube strings 34 includes a plurality of carbon nanotubes joined end-to-end by van der Waals attractive force. The plurality of carbon nanotubes in each of the carbon nanotube strings 34 is parallel to an axis of each of the carbon nanotube strings 34. There is a larger distance between two adjacent carbon nanotube strings 34, further reducing the shielding effect between two adjacent carbon nanotube strings 34.

Figure 8:
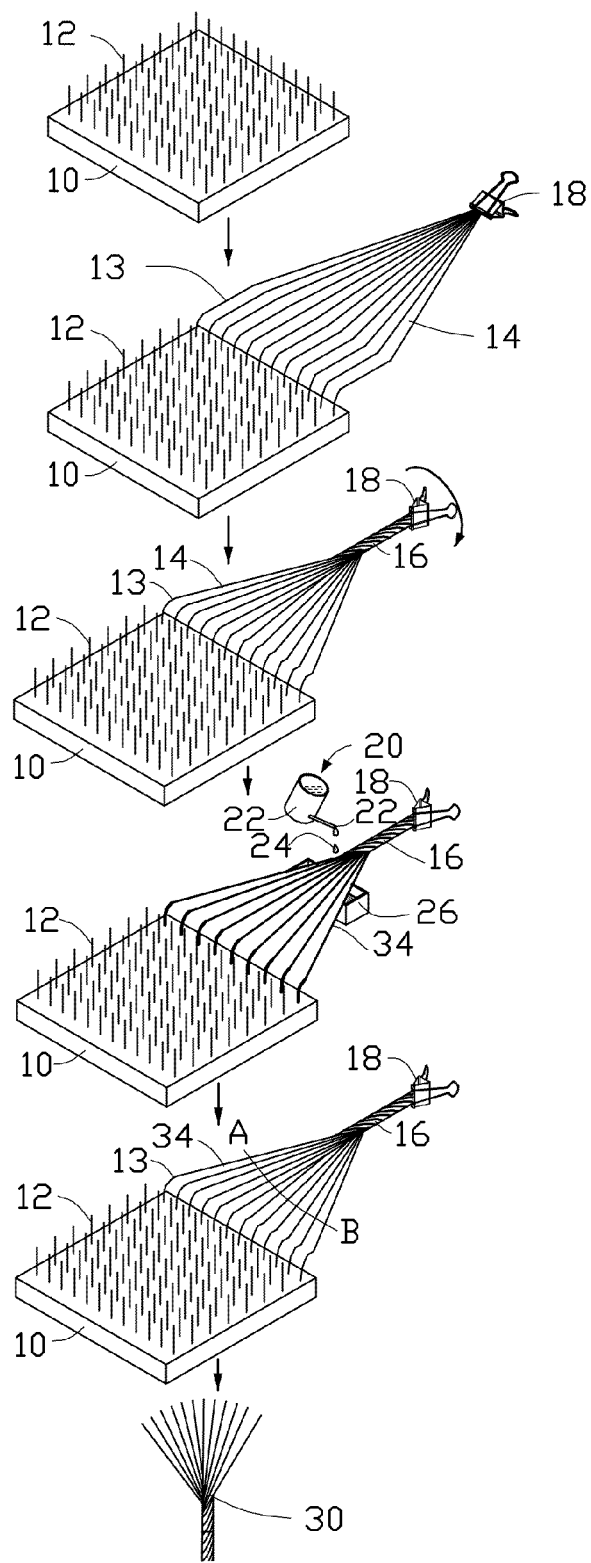
FIG. 8 is a flowchart of a fourth embodiment of a method for making a carbon nanotube field emitter.

Referring to FIG. 8, an embodiment of the method for making the carbon nanotube field emitter 30 is shown where before cutting off the triangle region 14 from the carbon nanotube film, the triangle region 14 is treated to a plurality of carbon nanotube strings 34 with the organic solvent 24. In this embodiment, the carbon nanotube wire 16 is formed by twisting the portion of the carbon nanotube film. A method of triangle region 14 treated to a plurality of carbon nanotube strings 34 with the organic solvent 24 is described in above paragraph.

Figure 9:
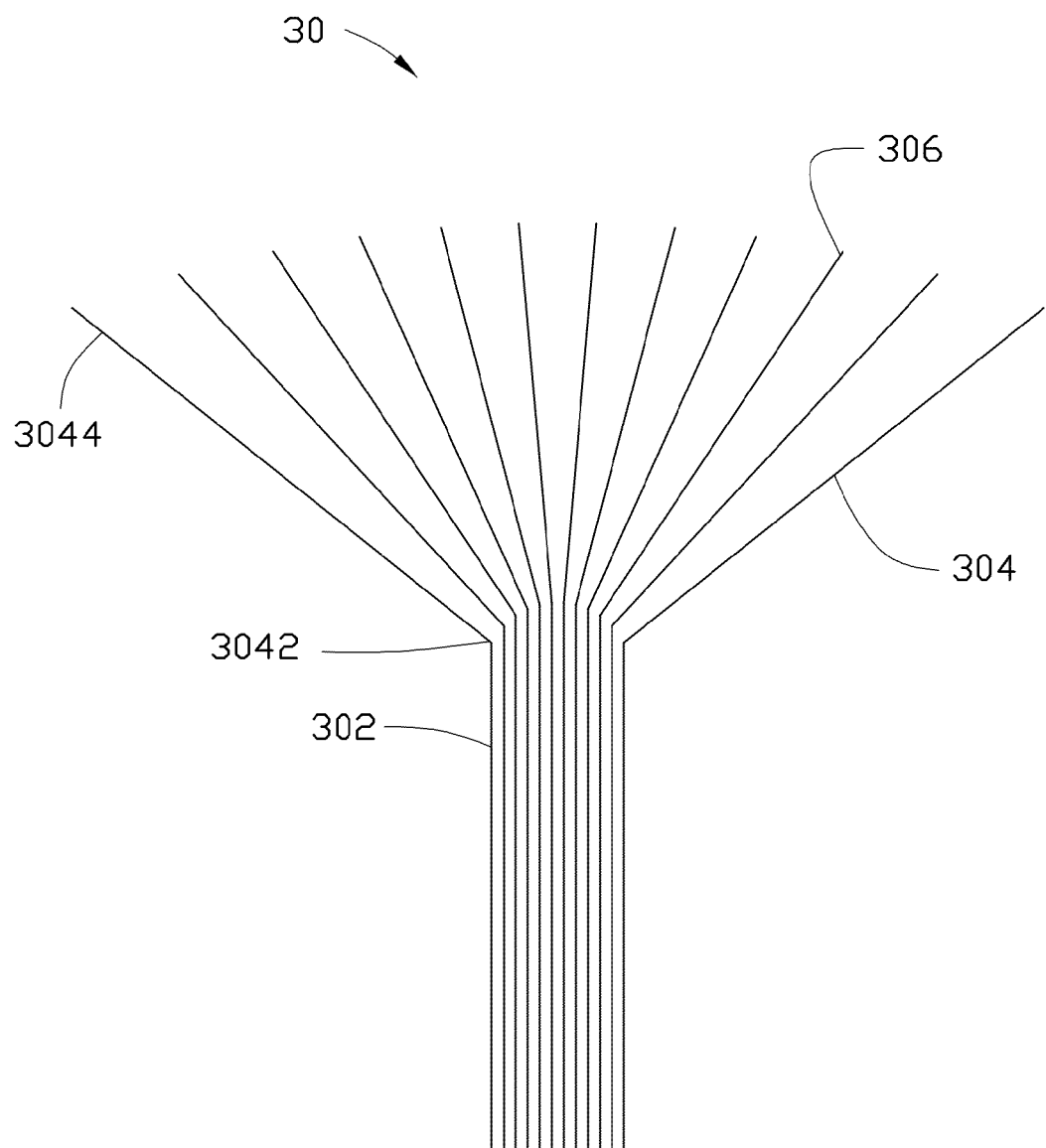
FIG. 9 is a schematic view showing a structure of first embodiment of the carbon nanotube field emitter.
Figure 10:
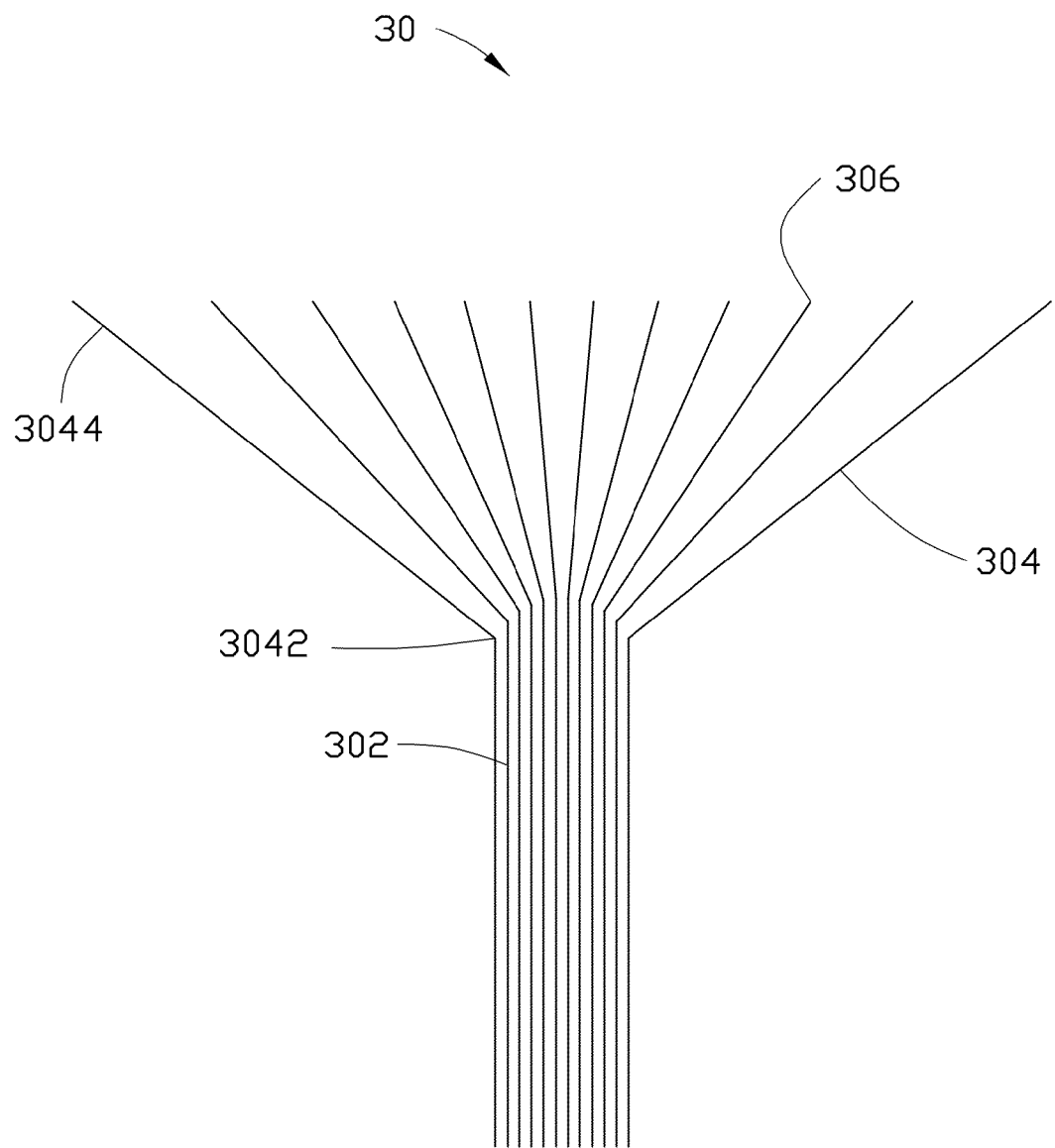
FIG. 10 is a schematic view showing another structure of first embodiment of the carbon nanotube field emitter.

Referring to FIGS. 9 and 10, the carbon nanotube field emitter 30 includes a carbon nanotube structure including a plurality of carbon nanotubes joined end-to-end by van der waals attractive force. The carbon nanotube structure has two joined portions. One portion is a triangle shaped carbon nanotube film, which is an electron emitting portion 304. The other portion is a carbon nanotube wire 16, which is a support portion 302 of the carbon nanotube field emitter 30. The triangle shaped carbon nanotube film has an aggregated portion 3042 and a dispersed portion 3044. The triangle shaped carbon nanotube film has a fan-shaped divergence along a direction from the aggregated portion 3042 to the dispersed portion 3044. The plurality of carbon nanotubes is aggregated together at the aggregated portion 3042 and joined with the carbon nanotube wire 16 of the support portion 302. The plurality of carbon nanotubes is radially arranged in the triangle shaped carbon nanotube film and has a relatively larger interspace therebetween at the dispersed portion 3044 than at the aggregated portion 3042. The end of the plurality of carbon nanotubes at the dispersed portion 3044 of the triangle shaped carbon nanotube film are a plurality of electron emitting tips 306 of the electron emitting portion 304.

A distance between two adjacent carbon nanotubes increases gradually along a direction from the aggregated portion 3042 to the dispersed portion 3044, to reduce a shielding effect between two adjacent carbon nanotubes and improve an emission current density of the carbon nanotube field emitter 30.

The carbon nanotube wire 16 is formed by twisting a portion of the carbon nanotube film or shrinking a portion of the carbon nanotube film with the organic solvent 24. The carbon nanotube wire 16 has good mechanical strength and bears larger field strength, to support entire carbon nanotube field emitter 30. Moreover, the electron emitting portion 304 has a free-standing structure, improving strength of entire carbon nanotube field emitter 30.

Figure 11:
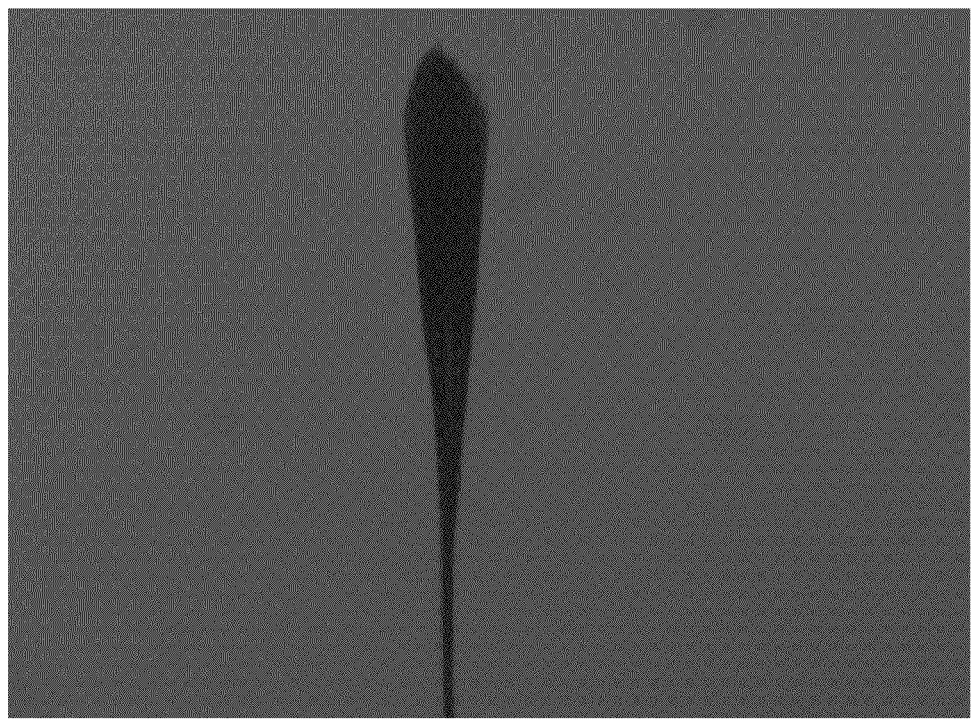
FIG. 11 is an optical microscope image of one embodiment of the carbon nanotube field emitter.
Figure 12:
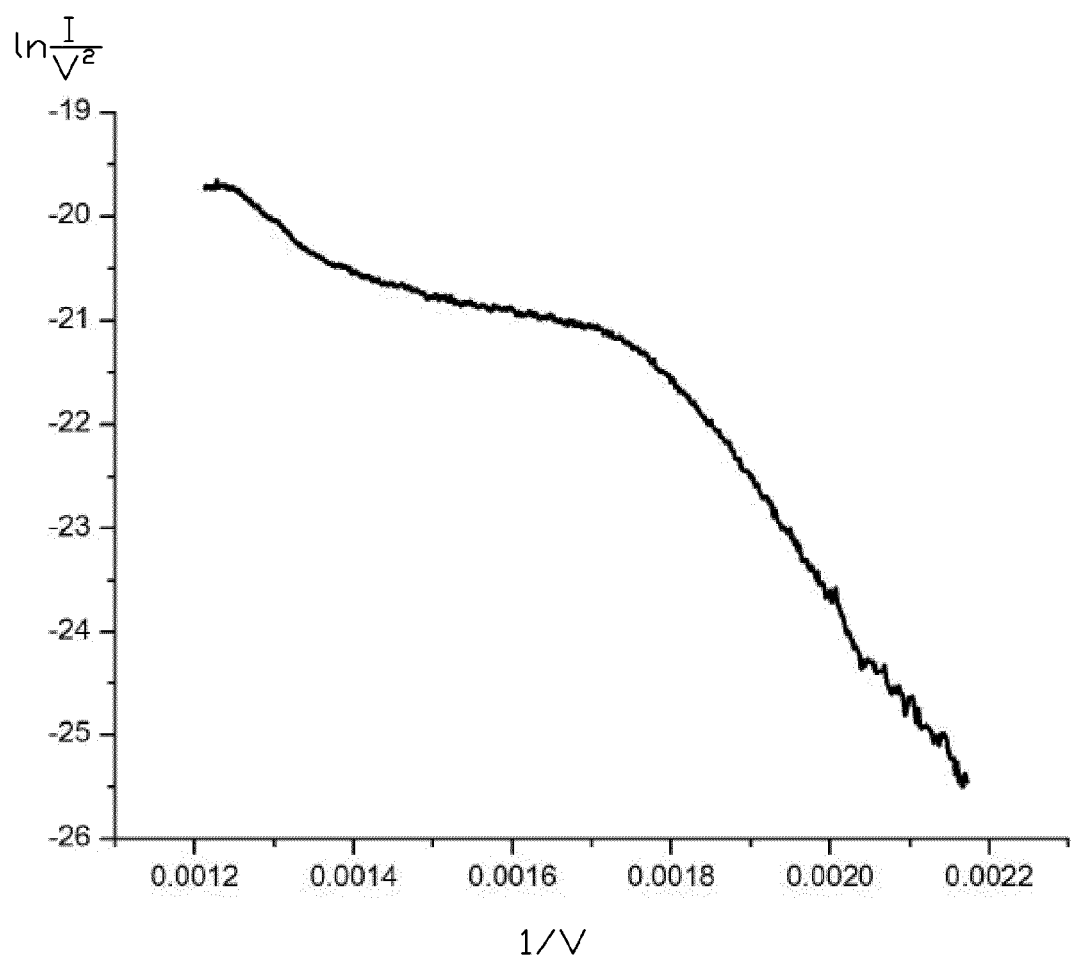
FIG. 12 is a FN curve of one embodiment of the carbon nanotube field emitter.
Figure 13:
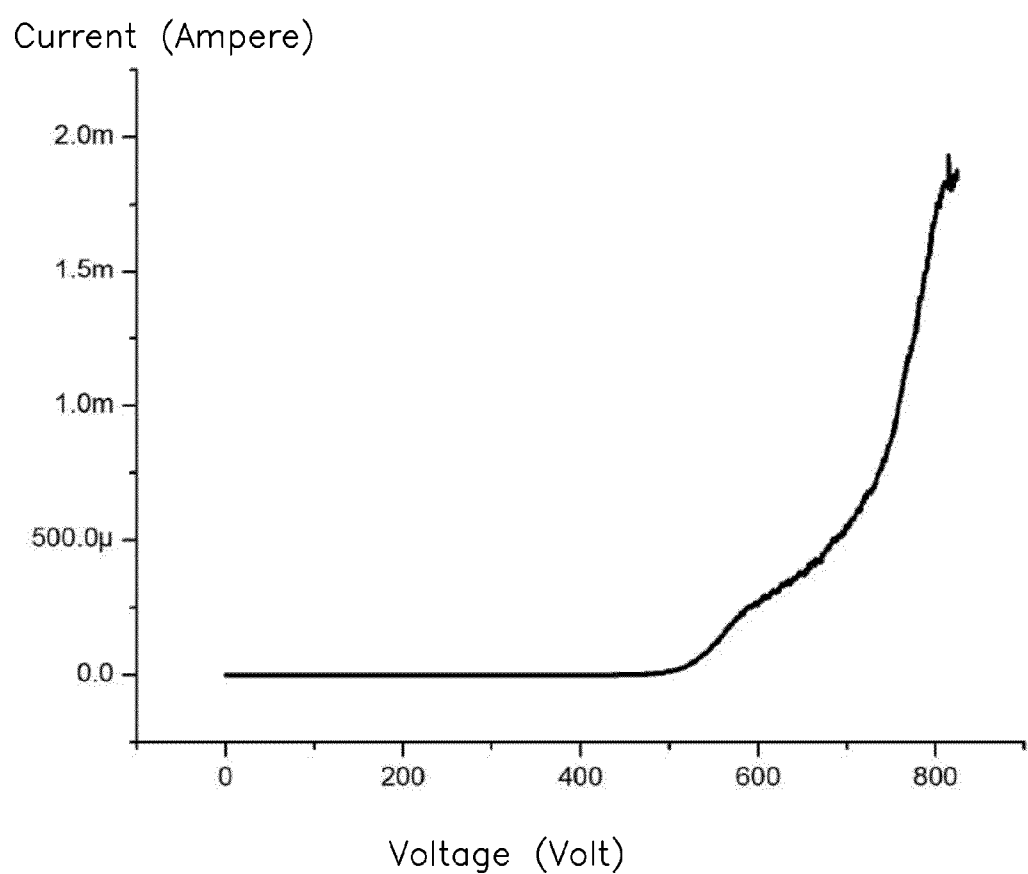
FIG. 13 is a current-voltage curve of one embodiment of the carbon nanotube field emitter.

The plurality of carbon nanotubes in the carbon nanotube wire 16 can be parallel to each other. In other embodiments, the plurality of carbon nanotubes in the carbon nanotube wire 16 can be helically oriented around the axial direction of the carbon nanotube wire 16. A connection line of the plurality of electron emitting tips 306 is an arc line as shown in FIG. 9. The connection line of the plurality of electron emitting tips 306 is a straight line as shown in FIG. 10. An optical microscope image of the carbon nanotube field emitter 30 is shown in FIG. 11. Referring to FIG. 12, the carbon nanotube field emitter 30 has good field emission property. Referring to FIG. 13, when an emission voltage of the carbon nanotube field emitter 30 is 800 volts, an emission current of the carbon nanotube field emitter 30 is 2 milliamperes. Therefore, the carbon nanotube field emitter 30 has a larger emission current density.

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not restricted to the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A method for making a carbon nanotube field emitter, comprising steps of:
   (S1) providing a carbon nanotube array located on a substrate;
   (S2) drawing a carbon nanotube film from the carbon nanotube array by a drawing tool, wherein the carbon nanotube film comprises a triangle region;
   (S3) forming a carbon nanotube wire of a portion of the carbon nanotube film, wherein the carbon nanotube wire comprises a vertex of the triangle region;
   (S4) cutting along the triangle region from the carbon nanotube film with a laser beam along a cutting line, and a distance between the vertex of the triangle region and the cutting line is in a range from about 10 microns to about 5 millimeters.

2. The method of claim 1, wherein the drawing tool is a clamp or an adhesive tape.

3. The method of claim 1, wherein in the step (S3), forming the carbon nanotube wire comprises treating the portion of the carbon nanotube film with an organic solvent.

4. The method of claim 3, wherein the organic solvent comprise a material that is selected from the group consisting of ethanol, methanol, acetone, dichloroethane, chloroform, or a mixture thereof.

5. The method of claim 1, wherein in the step (S3), forming the carbon nanotube wire comprises twisting the portion of the carbon nanotube film.

6. The method of claim 5, wherein in the step (S3), forming the carbon nanotube wire further comprises fixing the substrate and rotating the drawing tool.

7. The method of claim 5, wherein a value of a twist force is in a range from about 0.00005 Newton to about 0.001 Newton.

8. The method of claim 1, wherein in the step (S4), distance between the vertex of the triangle region and the cutting line is in a range from about 10 microns to about 1 millimeter.

9. The method of claim 1, wherein in the step (S4), the cutting line is an arc.

10. The method of claim 1, wherein in the step (S4), the cutting line is a straight line.

11. The method of claim 1, wherein in the step (S4), the laser beam has a power of 3.6-12 watts, a moving speed of 1-1000 mm/s, a wavelength of 1.06 microns and a bean spot diameter of 20 microns.

12. The method of claim 1, wherein in the step (S2), two carbon nanotube films are simultaneously drawn from one carbon nanotube array.

13. The method of claim 1, wherein in the step (S4), the length of the cutting line is in a range from about 1 millimeter to about 10 millimeters.

14. The method of claim 1, wherein the carbon nanotube film comprises a plurality of carbon nanotubes joined end-to-end by van der Waals attractive force.

15. A method for making a carbon nanotube field emitter, comprising steps of:
- (S1) providing a carbon nanotube array located on a substrate;
- (S2) drawing a carbon nanotube film from the carbon nanotube array by a drawing tool, wherein the carbon nanotube film comprises a triangle region;
- (S3) forming a carbon nanotube wire of a portion of the carbon nanotube film, wherein the carbon nanotube wire comprises a vertex of the triangle region;
- (S4) treating the triangle region of the carbon nanotube film with an organic solvent;
- (S5) cutting along the triangle region from the carbon nanotube film with a laser beam along a cutting line, and a distance between the vertex of the triangle region and the cutting line is in a range from about 10 microns to about 5 millimeters.

16. The method of claim 15, wherein in the step (S2), the carbon nanotube film comprises a plurality of carbon nanotubes joined end-to-end by van der Waals attractive force.

17. The method of claim 15, wherein in the step (S4), the triangle region of the carbon nanotube film is shrunk into a plurality of carbon nanotube strings with the organic solvent.

18. The method of claim 17, wherein in the step (S4), the triangle region comprises a plurality of portions spaced from each other, the plurality of portions is soaked by sprinkling the organic solvent, and each of the plurality of portions shrinks into the carbon nanotube string.

* * * * *